United States Patent
Been et al.

(10) Patent No.: US 10,394,754 B2
(45) Date of Patent: Aug. 27, 2019

(54) INDEXING MULTIPLE TYPES OF DATA TO FACILITATE RAPID RE-INDEXING OF ONE OR MORE TYPES OF DATA

(75) Inventors: David O. Been, Seligman, AZ (US); Michael Busch, Mountain View, CA (US); Osamu Furusawa, Sagamihara (JP); Frederick S. Grennan, San Jose, CA (US); Fumihiko Terui, Sagamihara (JP); Justo L. Perez, Salinas, CA (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 12/719,548

(22) Filed: Mar. 8, 2010

(65) Prior Publication Data
US 2011/0219008 A1  Sep. 8, 2011

(51) Int. Cl.
  *G06F 7/00* (2006.01)
  *G06F 16/00* (2019.01)
  *G06F 16/23* (2019.01)
  *G06F 16/22* (2019.01)

(52) U.S. Cl.
CPC .............. *G06F 16/00* (2019.01); *G06F 16/23* (2019.01); *G06F 16/22* (2019.01)

(58) Field of Classification Search
None
See application file for complete search history.

(56) References Cited

U.S. PATENT DOCUMENTS

| | | | |
|---|---|---|---|
| 7,836,037 B2* | 11/2010 | Renkes et al. | 707/705 |
| 2005/0234984 A1 | 10/2005 | Rogerson et al. | |
| 2006/0053128 A1 | 3/2006 | Gestrelius et al. | |
| 2006/0277157 A1 | 12/2006 | Seidl et al. | |
| 2007/0124277 A1 | 5/2007 | Chen et al. | |
| 2008/0306911 A1 | 12/2008 | Loofbourrow et al. | |
| 2008/0306949 A1* | 12/2008 | Hoernkvist et al. | 707/7 |
| 2008/0306978 A1 | 12/2008 | Hoernkvist | |
| 2008/0307013 A1* | 12/2008 | Loofbourrow et al. | 707/203 |
| 2008/0319988 A1 | 12/2008 | Bhattacharjee et al. | |
| 2009/0063410 A1 | 3/2009 | Haustein et al. | |
| 2009/0157729 A1 | 6/2009 | Herlocker et al. | |
| 2009/0228528 A1 | 9/2009 | Ercegovac et al. | |

OTHER PUBLICATIONS

Fowler, M., "Using Metadata," Software, IEEE, vol. 19, Issue 6, pp. 13-17, Nov.-Dec. 2002.

(Continued)

*Primary Examiner* — Paul Kim
(74) *Attorney, Agent, or Firm* — Joseph Polimeni; Edell, Shapiro & Finnan, LLC

(57) ABSTRACT

A method and indexing system indexes the content of a body of documents into a content index, and the metadata of the documents into a metadata index which is a parallel index to the content index. The metadata is copied into a data store that is easily accessible by the indexing system and is stored in native form. The indexing system can dynamically re-index the metadata from the native metadata in the data store to produce a new metadata index which is used to replace the original metadata index. Search queries received by a search engine associated with the indexing system are applied to both the content and metadata index and the results are merged for return.

17 Claims, 6 Drawing Sheets

(56) References Cited

OTHER PUBLICATIONS

Zein, O.K., et al., "A Metadata Model for Web Services Applied to Index and Discover E-Learning Services", ICTTA's 06, 2nd, vol. 1, pp. 626-630, 2000.
Edvardsen, L., et al.; "Using Automatic Metadata Generation to Reduce the Knowledge and Time Requirements for Making SCORM Learning Objects", 3rd IEEE Conf. on Digital Ecosystems and Technologies, Jun. 1-3, 2009, pp. 253-258.

\* cited by examiner

User-Defined Fields

| Field Name | Display Name | Data Type | Collection | Tokenized | Case-Sensitive | Enable Lowercase | Delete Mapping |
|---|---|---|---|---|---|---|---|
| email | email | string | mail.from | ☐ | ☐ | ☐ | ☐ |
| int_id | int_id | string | mail.int | ☐ | ☐ | ☐ | ☐ |
| mail_id | mail_id | string | mail.mail | ☐ | ☐ | ☐ | ☐ |
| title | title | string | mail.subject | ☐ | ☒ | ☐ | ☐ |

System-Generated Fields

| Field Name | Display Name | Data Type | Collection | Select Fields... |
|---|---|---|---|---|
| cc | cc | string | Mail.cc | ☐ |
| docdate | docdate | date | Mail.date | ☐ |
| from | from | string | Mail.from | ☐ |
| subject | subject | string | Mail.subject | |

*FIG. 8*

INDEXING MULTIPLE TYPES OF DATA TO FACILITATE RAPID RE-INDEXING OF ONE OR MORE TYPES OF DATA

BACKGROUND

The present invention relates to the field of information processing systems, and more particularly to search applications and means of indexing information to facilitate searches.

Information networks often store large amounts of data in the form of documents and other objects. For example, it is common in enterprise networks to store email, including attachments and associated data. Information is stored for later retrieval and reference for numerous purposes. Stored documents are often searched to find specific information, determine patterns, and so on. Given that the amount of stored data would make it impossible for a person to manually search through the data to find a desired document or reference, search engines have been developed. A search engine allows a user to provide terms and qualifiers as parameters of a search, and the search engine determines which documents match the provided search criteria. Search engines do not search through each document or object, and instead use an index of the documents. An index lists all searchable terms in the documents, and indicates which documents each term appears in, and indicates the term's position or positions in the document. An index indicating both of these parameters is referred to as an inverted index.

Documents have two types of information that users typically wish to search, which are the content of the document and the metadata associated with the document. The content is the information which is rendered for the user by, for example, an application. The metadata is data which describes or frames the content to provide some context. For example, in a typical email document there is a text content written by the email author to a recipient. The email address of the author and the recipient, the subject, and other data such as time sent, are all metadata that is associated with the document. The metadata is information maintained in specified fields of the document, and may be handled differently than the content. Depending on the document type, some metadata may not be displayed when the document content is rendered for a user in an application interface window.

Clearly, metadata is important. It is therefore desirable to be able to search the metadata when searching a body of documents. The metadata can be indexed along with the content to make metadata searchable. Special conventions can be used in the index to indicate a particular term appears in a metadata field, as well as which metadata field. A search engine can be provided with field definitions or characteristics against which to search. For example, a given field may be defined to be case sensitive, so that capital letters are distinguished from lower case letters. Once the index is generated, though, it becomes very difficult to change such definitions because the entire body of documents will have to be re-indexed, which can be expensive and time consuming. Therefore there is a need for an indexing system that allows portions of the indexed content to be re-indexed with different settings without requiring a re-indexing of all documents.

SUMMARY

Embodiments of the invention include a computer implemented method, system, and computer program product for dynamically re-indexing metadata by indexing the content of the documents to generate an inverted content index, indexing the metadata of the documents to generate a first metadata index, storing the metadata in native form, cross-referenced using the document identifiers, re-indexing the metadata from the metadata store to generate a second metadata index while maintaining the first metadata index available for searching, and then replacing the first metadata index with the second metadata index without substantially interrupting the ability to search the metadata.

Embodiments of the invention further include a computer program product and method for re-indexing data contained in documents by receiving indexing settings at an indexing engine of the indexing system which include indexing settings for the first and second types of data, indexing the first type of data of the documents to generate an inverted first data type index, indexing the second type of data of the documents to generate a second data type index, and providing the first and second data type indexes to a search engine by the indexing engine to allow searching of the indexes.

BRIEF DESCRIPTION OF THE SEVERAL VIEWS OF THE DRAWINGS

FIG. 8 is an interface diagram of an admin interface for controlling operation of an indexing system, in accordance with an embodiment of the invention.

DETAILED DESCRIPTION

Figure 1:
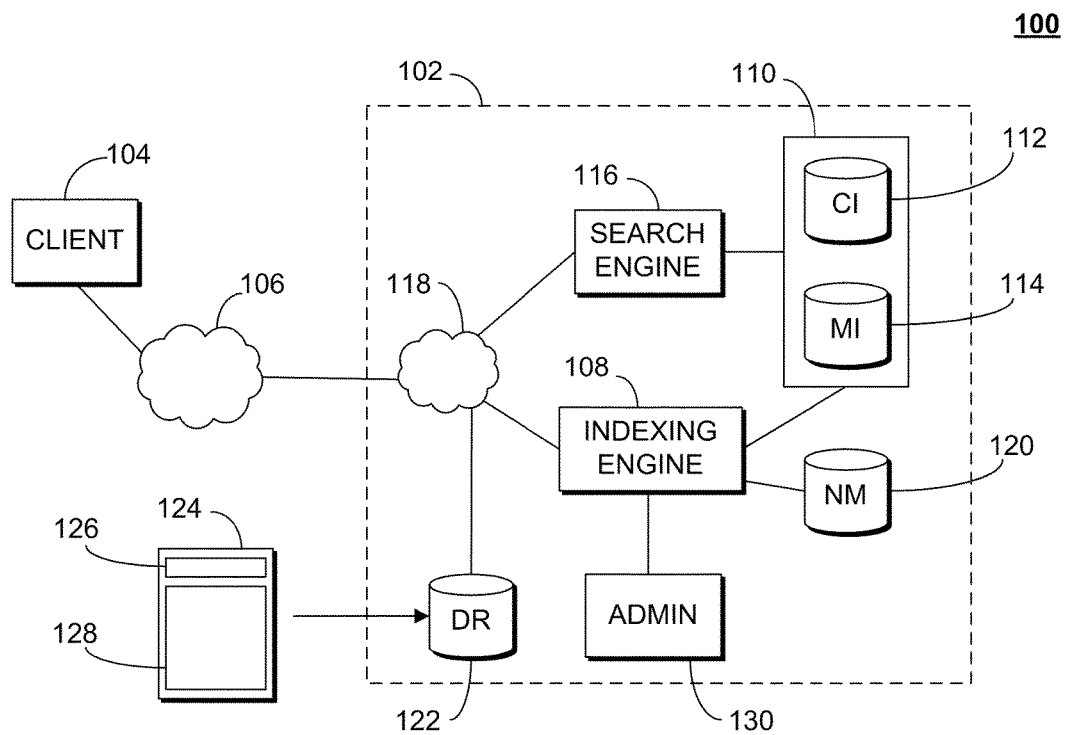
FIG. 1 is a block schematic diagram of an indexing and search system, in accordance with an embodiment of the invention.

The present invention discloses a solution for the problem of re-indexing data by maintaining separate indexes for different categories of data found in the documents being indexed. More specifically, the invention includes an indexing system that identifies different categories or types of data in a collection of electronic documents, and indexes each different category of data into a separate but parallel index. The invention is advantageous for allowing quick re-indexing of certain types of data without having to re-index the entire body of indexed documents. Typically the documents have one type of data that accounts for a large majority of the total document information, and one or more other types of data that are a relatively small proportion of the document information. By separately indexing these types of data that are the smaller portion of document information, they may be re-indexed relatively quickly. A common example is documents that have content information, such as the body of an email that is written by a sending party, and metadata, such as an email address, date, subject, and so on. Typically the body of the email will contain substantially more information than is contained in the metadata. Thus, the content and metadata may be separately indexed into parallel indexes. The metadata itself may be divided and indexed into separate indexes, as well, such that there may be, for example, an index of subjects, an index of sending party email addresses, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

Referring now to FIG. 1, a block schematic diagram of an indexing and search system 100 is shown, in accordance with an embodiment of the invention. The system includes an indexing system 102 which indexes documents to support searching by clients such as client 104. The indexing system 102 is a computer implemented indexing system which operates according to computer useable program code. The indexing system 102 and client are connected via a network 106 which may be a packet network operating according to Internet Protocol (IP) networking practices. The indexing system 102 includes an indexing engine 108, which may be implemented in software run by a processor on an indexing server. The indexing engine 108 is responsible for generating indexes 110 from a collection of electronic or digital documents. In the simplified example of FIG. 1, the indexes include a first data type index 112 and a second data type index 114. Those skilled in the art will realize, however, that more than two indexes may be generated. Generally there is one main index which indexes a greater portion of the collective information contained in the documents, and one or more additional indexes for each additional type of information being indexed. Generally these additional indexes index relatively small portions of information contained in the documents, although numerous arrangements will occur to those skilled in the art. The exemplary indexes 112 and 114 are parallel inverted indexes, and refer to the same documents using the same document identifiers. The indexes are segments of all of the data in the documents managed by the system. Segmented indexes are described in co-pending and commonly assigned U.S. patent application Ser. No. 12/475,300 which was filed 29 May 2009, and is titled "Parallel Segmented Index Supporting Incremental Document and Term Indexing," the disclosure of which is hereby incorporated by reference. Each of the indexes 112, 114 index different categories or types of data found in documents. For example the first index 112 may be a content index (CI) and the second index 114 may be a metadata index (MI). A content index is an index of the content of documents, while the metadata index is an index of the metadata of the documents. For example, in an email document, the content of the mail document is the body of the email document or message, which is written by a user. The metadata is other information exclusive of the body, including destination email addresses, subject, date information, and so on. The metadata may be a mix of data generated automatically and data provided by the user. The indexes allow a search engine 116 to locate documents in response to search queries that best match the search criteria. The indexes 110, indexing engine, and search engine may all be located in a server cluster and connected via a local network 118, or any other conventional networking means.

Generally one type of data, such as metadata, will have a substantially smaller amount of data than the other or main type of data, such as the content data. Accordingly, the index of that type of data will be smaller, and consequently re-indexing that type of data takes less time. The indexing system may store a copy of the data in native form in a local store 120. For example, the indexing system can store native metadata (NM) copied from all indexed documents. This allows the indexing system to re-index the metadata locally, without having to re-process the documents when the indexing settings are changed. For example, a given field of metadata may have originally been indexed without regard to case, but it may subsequently be decided to re-index such that the index is case-sensitive. A user or admin can simply indicate the new desired indexing settings and have the data re-indexed from the native copy 120. When adding data to the native data store 120, the indexing engine stores each document's data that is in the category of data being stored as a record including the document's unique identifier. Furthermore, because the index is an inverted index and indicates the relative location of searchable terms, the record stored in the native data store for each record indicates an offset or other means of locating terms in the document. One means for identifying the relative location is to refer to the fields in which the data is found. For example, in email metadata, there will be a subject field, date field, email address fields for sender, addressee, copy recipients, and so on. Thus, the record for each document's metadata will indicate the field as well as the content of the field.

The initial indexing is performed by indexing a collection or body of documents maintained by the system, which may be stored in a document repository (DR) 122. The document repository stores a collection or body of documents, such as document 124. A document can be any file that has searchable content, including but not limited to email, text-based documents, mark-up forms, and mixed media files, among others. The documents have at least two types or categories of data 126 and 128. For example, the documents may include content, which is rendered for users viewing the document, and metadata, which is associated data separate from the content. Other examples include publications which have an abstract, there the content or body of the publication is one category of data or information and the abstract may be treated as a different category of data for the purposes of indexing. In the case of metadata, fields may be identified and defined for the purpose of indexing, allowing for specific indexing settings to be applied to each field. For example, in email there is a subject field, date field, and fields for email addresses. The invention allows for an operator of the inventive indexing system to specify, for example, that the subject field may be case-sensitive while email address fields are not case-sensitive. By making a field case sensitive, the term "smith" may be indexed as a separate term from "Smith" in the field.

By separating the indexing of the two (or more) categories of data into parallel inverted indexes, the invention allows re-indexing of one or more categories with different indexing settings without having to re-index all data in the documents. When the data being re-indexed is stored in native form, such in a native metadata store 120, the system doesn't need to reprocess the documents, which allows for faster re-indexing of the metadata. Furthermore, the native data store may be kept locally to the indexing system. For example, the native data store may be kept in the same computer readable media device as the index generated from the native data, such as on the same disc system or disc drive. Alternatively it may be kept on medium separate from the medium used to store the index generated from the native data, but on a high speed connection such as a bus to the processor used to generate the index, or on a disc connected to the indexing processor via a local network connection.

The document repository 122 may be co-located with the indexing system, as shown, or alternatively, the DR 122 may be located elsewhere in the system, but accessible by the indexing system. The DR 122 may be maintained by the indexing system as a mirrored cache of a main document repository located elsewhere in the system.

The search and indexing system facilitates searching via the search engine 116. The search engine receives search queries from clients indicating terms and possibly other parameters to be searched. The search engine applies the query to each of the indexes of the collective indexes 110. Each index 112, 114 (or others) produce search results. For example, the content index 112 will provide content search results and the metadata index 114 will provide metadata search results. Because the indexes are parallel, the search results may be merged into combined search results which are returned by the search engine to the requesting client.

Figure 2:
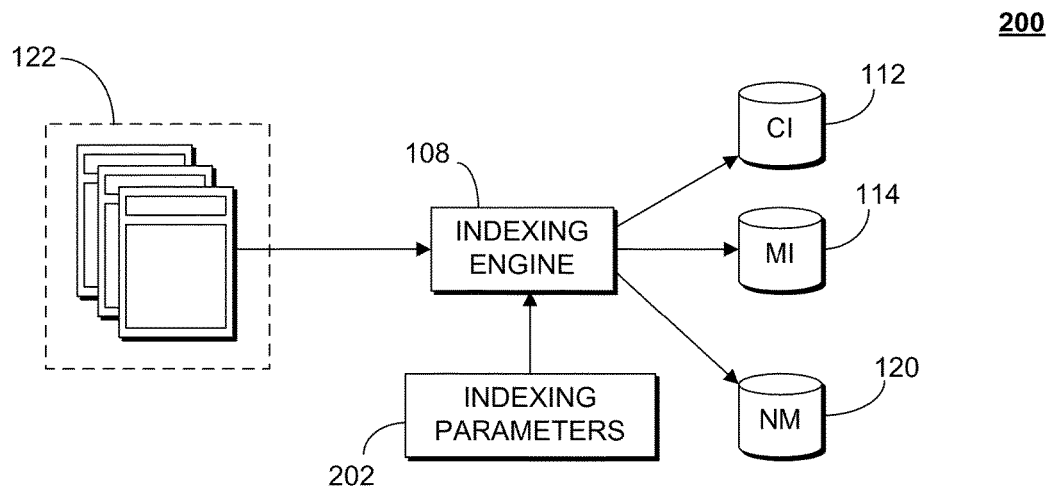
FIG. 2 is an indexing diagram illustrating an indexing operation of an indexing system, in accordance with an embodiment of the invention.

FIG. 2 is an indexing diagram illustrating an indexing operation 200 of an indexing system, in accordance with an embodiment of the invention. The indexing engine 108 processes documents from a repository 122 to generate, for example, a content index 112 and a metadata index 114. The indexing engine, while processing the documents, may also generate a native data store such as native metadata store 120. The indexing engine may be provided with indexing parameters or settings, which define how the data is to be indexed, and may specify different settings for different types of data and different fields of data. The indexing parameters indicate, for example, whether terms are case sensitive, tokenization, how hyphened terms are treated, and so on. To initially generate the indexes, the indexing engine parses each document, noting each term as identified according to the indexing parameters, each term's location in the document, and the document identifier. The process is performed for each category of data defined in the documents, and for each document in the repository. An index is generated for each category of data, and the indexes are parallel. Furthermore, one or more categories of data may be expected to be re-indexed according to user preferences. Accordingly, while processing the documents, the indexing engine may generate a native data store such as a native metadata store 120. Alternatively, the native data store may be generated by other means, such as by a document librarian when documents are added to the repository. The native data store may be stored in the same media as the index generated from the data cached in the native data store, or otherwise in a location that permits rapid access to the native data to facilitate rapid re-indexing of the data in the native data store. Furthermore, the native metadata may be stored as a parallel index itself.

Figure 3:
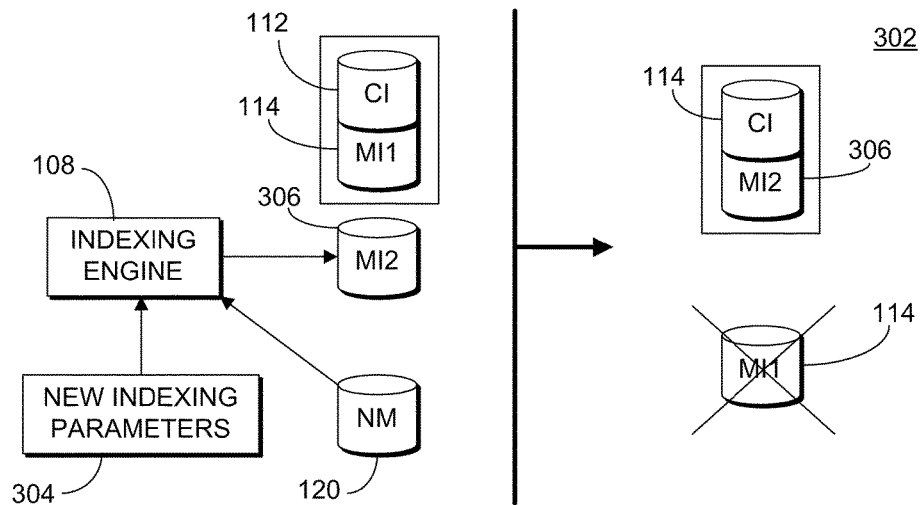
FIG. 3 is an indexing diagram illustrating creation of a new index in accordance with an embodiment of the invention.

FIG. 3 is an indexing diagram illustrating creation of a new index in accordance with an embodiment of the invention. On the first side 300 the indexes 112, 114 that were created previously in, for example, FIG. 2 are present and available for searches and other client access. The metadata index 114 is a first metadata index. When the operator of the indexing system decides to re-index one of the indexes, such as the metadata index, new indexing parameters 304 are provided to the indexing engine along with instruction to re-index the data corresponding to the indicated index. The indexing engine initializes a second metadata index 306, and re-indexes the metadata to complete the second metadata index. While this is occurring the first metadata index is left available for use by clients for searching. In certain embodiments of the invention the indexing engine uses the native data stored in, for example, native metadata index 120 to generate the second metadata index 306.

Once the indexing engine is finished generating the second metadata index 306, the indexing system replaces the first metadata index with the second metadata index as indicated on side 302. The second metadata index is committed to operation and is thereafter available for searches. The first metadata index 114 may then be discarded. The arrangement of indexes by invention allows for relatively quick re-indexing of certain data types of the documents managed by the system. If all of the data of the documents was indexed into a single index, the entire body of documents would have to be re-indexed to achieve the same results provided by the invention. By indexing the collective data in the documents into segments by data category, a particular category of data can easily be re-indexed without having to process all documents or all data over again. Furthermore, by generating a replacement index while the original is still accessible, users do not lose the ability to conduct searches. The time taken to re-index the data can be reduced by maintaining a native copy of the data in a store that is local to the indexing engine.

Figure 4:
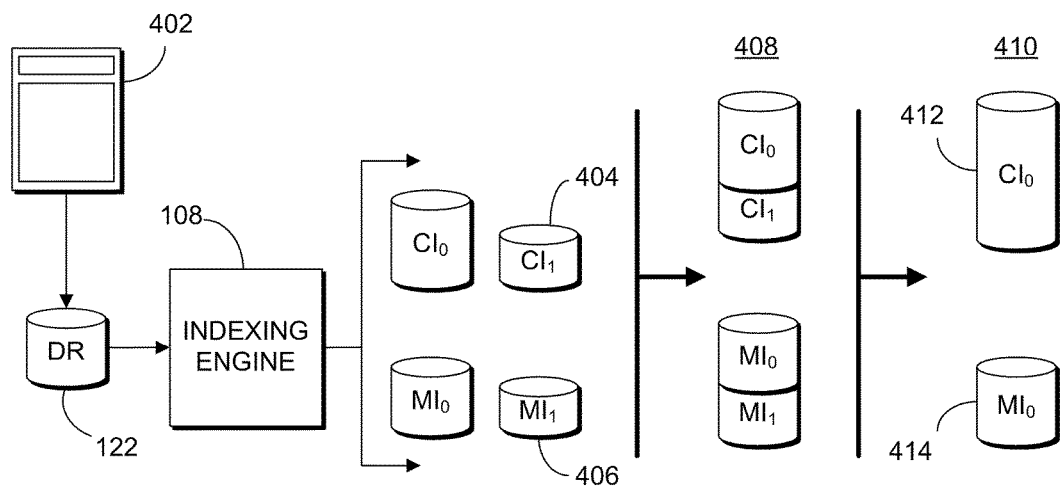
FIG. 4 is an indexing diagram showing the use of segmented indexes for ingesting new data into an indexing system, in accordance with an embodiment of the invention.

FIG. 4 is an indexing diagram showing the use of segmented indexes for ingesting new data into an indexing system, in accordance with an embodiment of the invention. While the indexing system of the invention segments indexes by data category, it may also use index segments to ingest new data into the system. For example, when new document 402 is added to the document repository 122, the indexing engine creates, or adds to, a content index segment 404 and a metadata index segment 406. Content data of the new document is indexed into new content index 404, and the metadata of the new document is copied in native form to the native data repository and indexed into new metadata index 406. Searches are performed on main indexes and their associated new segments. When adding the native metadata of the new document into the native data repository, there is no need to separate it into a new segment. At some point, enough new data accumulates in the new index segments 404, 406 that they can be merged into the main indexes, and illustrated at positions 408 and 410. At 410 the segments have been fully merged into the main indexes, and the process may repeat as needed as new documents are added to the system.

Figure 5:
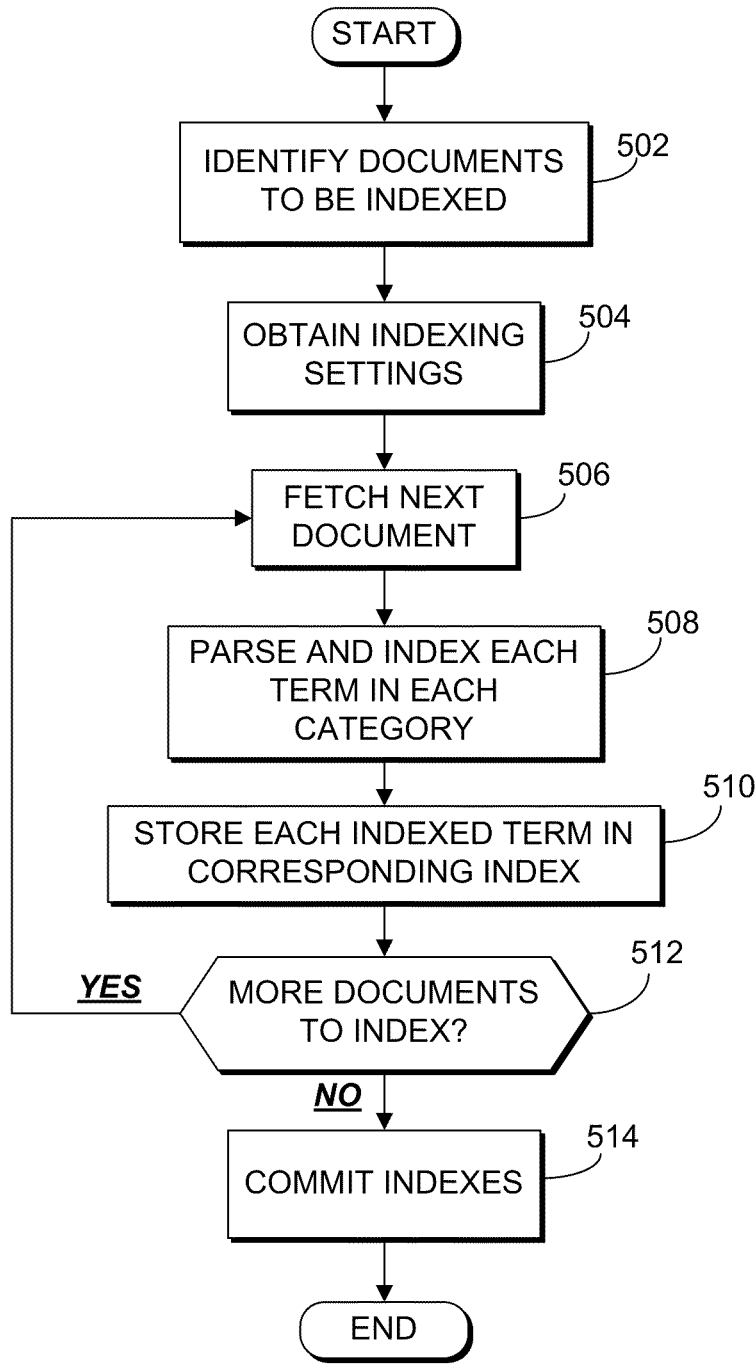
FIG. 5 is a flow chart diagram of a method of generating indexes, in accordance with an embodiment of the invention.

FIG. 5 is a flow chart diagram 500 of a method of generating indexes, in accordance with an embodiment of the invention. The method can be performed as a computer implemented method on an indexing system such as that described herein. First, the system must identify which documents are to be indexed (502). Generally the documents are stored in a document repository, although the repository may be a distributed or segmented repository. Each document is assigned a unique document identifier. In some embodiments, there may be different document repositories for different types of documents. For example, email may be stored in an email repository while invoices may be stored in another repository. Once the documents that are to be indexed are identified, the system obtains the indexing settings (504). The indexing settings are parameters which dictate how terms are indexed, whether capitalization matters, if terms are to be tokenized, and so on. The indexing engine then commences by obtaining the first or next document to be indexed (506), and then parses and indexes each term in accordance with the indexing settings (508). Data in each category of data is indexed into a different corresponding index. For example, content data is indexed into a content index and metadata is indexed into a metadata index (510). The indexing engine may also store data of a particular category into a native data store after obtaining each document. The indexing engine checks to see if there are more documents to be indexed (512) and if so, returns to 506 to fetch the next document. If at 512 there are no more documents to index, then the method commences to commit the indexes so as to make them available for searching (514), and the method terminates.

Figure 6:
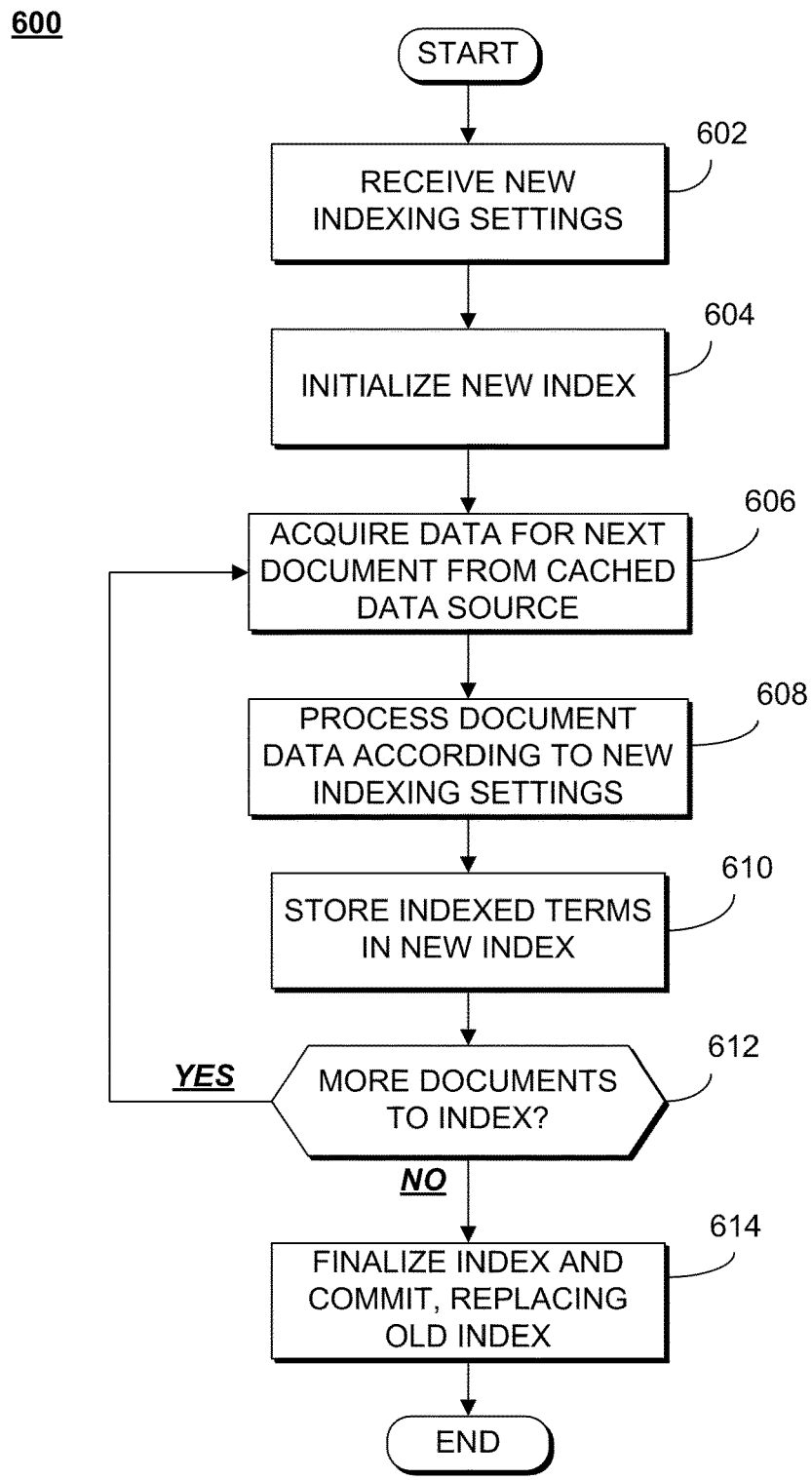
FIG. 6 is a flow chart diagram of a method of generating a replacement index for one category of data indexed by an indexing system, in accordance with an embodiment of the invention.

FIG. 6 is a flow chart diagram 600 of a method of generating a replacement index for one category of data indexed by an indexing system, in accordance with an embodiment of the invention. At the start of the present method, there are already indexes generated and in use for all categories of data that are meant to be searchable and separately indexed. While the existing indexes are available for searching, the indexing engine receives input to re-index one or more categories of data, including new indexing settings for each category of data to be re-indexed (602). In response, the indexing engine initializes a new index (604). The indexing engine then commences to process the data being re-indexed. For example, when the data being re-indexed is stored in native form, the indexing engine will pull each document's record from the native data store (606) and process it according to the new indexing settings (608), and adding the indexed terms into the initialized new index (610). The indexing engine then fetches the next record to be indexed (612). If there are no more records to be re-indexed the indexing engine finalizes the index a replaces the older index (614), making the new index available for searches.

Figure 7:
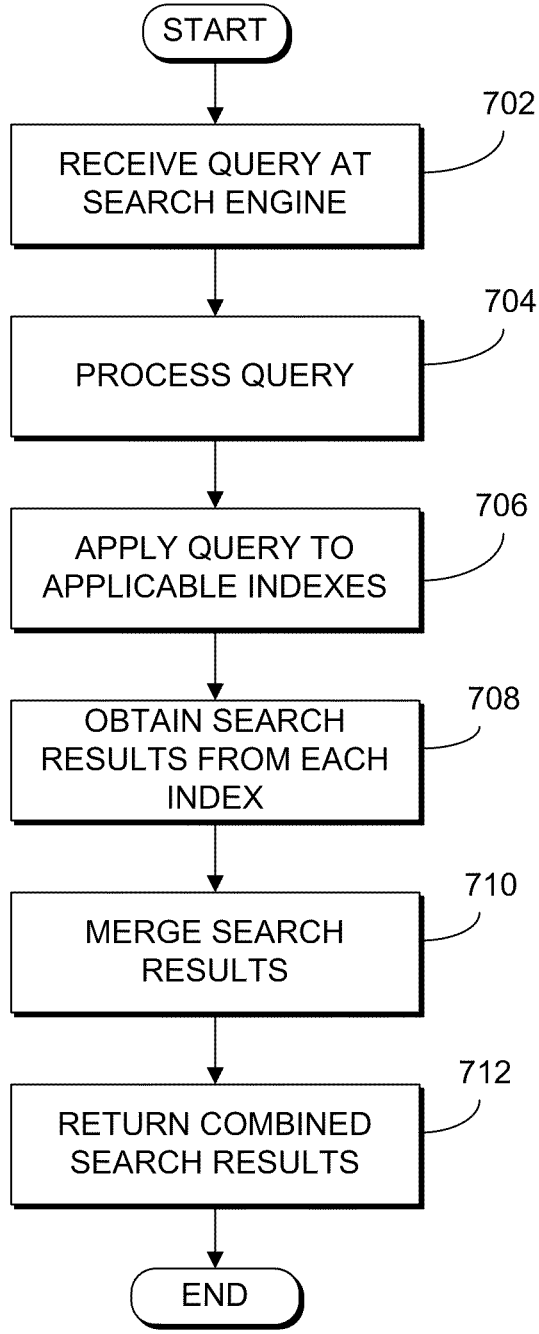
FIG. 7 is a flow chart diagram of a method of performing a search of multiple indexes, in accordance with an embodiment of the invention.

FIG. 7 is a flow chart diagram 700 of a method of performing a search of multiple indexes, in accordance with an embodiment of the invention. At the start of the method the search and indexing system has produced searchable parallel indexes where the indexes are differentiated on the basis of the category of data indexed therein. The search engine receives a search query from a client (702). The search engine then processes the query (704) to make sure it is structured correctly and provides valid search terms and operators. Once the query is validated, the search engine applies the terms to the indexes to determine the documents containing those terms, and further processes index information to determine which documents contain arrangements of terms that correspond to the search operators, if any are provided (706). Each search index yields search results (708), which are merged by the search engine (710) into a combined search result. Since the indexes are parallel, merging the results becomes a relatively trivial operation, requiring, in most cases a negligible increase in query execution time. Furthermore, the parallel structure of the indexes reduces the complexity necessary in designing the search engine to search the indexes and merge the results. Once the results are merged, the combined search results are then returned to the requesting client (712). To the client the combined results appear no different than if all document data had been indexed into one index, without regard to data categories. So, for example, the search engine may search a content index and a metadata index, merge the results by virtue of the fact that the indexes are parallel inverted indexes, and provide the combined result to the client.

FIG. 8 is an interface diagram 800 of an administrator's (admin) interface for controlling operation of an indexing system, in accordance with an embodiment of the invention. The interface would be presented by a graphical user interface of a computer or computer terminal connected to the computer on which the indexing system is instantiated, if not the same computer. In particular, the interface shown here would be provided in a window with a main section having "log out" and "help" links, as well as "SAVE" and "REVERT" radio buttons. In the main window are tabbed sections for "Administration" and "Search," with the "Administration" section in view. The "Administration" section has two scrollable main subsections for "User-Defined Fields" and "System-Generated Fields." There is also a radio button for adding additional fields labeled "Add a New Field." In the present example the interface is used for indexing metadata of email documents. In the "User-Defined Fields" subsection there are shown field names, display names, data types, as well as options such as whether to make the index for a given field case-sensitive, tokenized, and so on. In the present example, the interface is being used to make the subject field of the email documents case-sensitive, as indicated by the checked box in the "Case-Sensitive" column in the "title" row. Once the admin user has set up the index parameters as desired, the process can be started by selecting the "Save" button, whereupon the system will convert the selections into settings which are given to the indexing engine with a command to re-index the metadata according to the new indexing parameters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for performing searches by dynamically re-indexing metadata associated with content in a plurality of documents, each of the documents having a unique document identifier, the method comprising:
    indexing the content of the plurality of documents to generate an inverted content index;
    indexing the metadata of the plurality of documents to generate a first metadata index for each of a plurality of different metadata fields for the plurality of documents, each first metadata index for a corresponding metadata field being an inverted index that is parallel with the content index and refers to the same documents as the content index, wherein indexing settings are specified for each of the plurality of different metadata fields to indicate treatment of data in the metadata fields for indexing, and wherein the indexing settings include a parameter for one or more from a group of case sensitivity, tokenization, and hyphenation;
    storing the metadata of the plurality of documents in a local metadata store in native form and cross referenced with the unique document identifiers;
    re-indexing the metadata of the plurality of documents from the metadata in native form in the local metadata store to generate a second metadata index for a specified one of the metadata fields separately and independently from the first metadata index for the specified field while performing searches using the first metadata index for the specified field and maintaining the first metadata index for the specified field separate from the second metadata index for the specified field, the second metadata index for the specified field being an inverted index that is parallel with the content index and refers to the same documents as the content index, wherein the re-indexing of the metadata is performed from the metadata in native form in the local metadata store without processing the plurality of documents and results in different indexing settings for the second metadata index for the specified field in relation to the first metadata index for the specified field; and performing searches with the second metadata index by:
replacing the first metadata index for the specified field with the second metadata index and discarding the first metadata index for the specified field;
applying a query to the parallel content index and each metadata index to produce search results from each of the content and metadata indexes; and
merging the search results from the content index and each metadata index to produce combined search results for the query.

2. The method of claim 1, wherein re-indexing the metadata is performed in response to redefining at least one searchable attribute of the metadata.

3. The method of claim 1, wherein storing the metadata comprises storing the metadata in the same computer readable medium as the first and second metadata indexes.

4. The method of claim 1, wherein storing the metadata comprises storing the metadata in a local computer readable medium.

5. The method of claim 1, wherein the metadata is indexed according to metadata attribute mappings.

6. A computer program product comprising a non-transitory computer readable storage medium having computer usable program code embodied therewith for performing searches by indexing a plurality of documents having content and metadata, each of the plurality of documents having a unique document identifier, the computer usable program code that is stored in the non-transitory computer readable storage medium comprising:

computer usable program code operable to index the content of the plurality of documents to generate an inverted content index;

computer usable program code operable to index the metadata of the plurality of documents to generate a first metadata index for each of a plurality of different metadata fields for the plurality of documents, each first metadata index for a corresponding metadata field being an inverted index that is parallel with the content index and refers to the same documents as the content index, wherein indexing settings are specified for each of the plurality of different metadata fields to indicate treatment of data in the metadata fields for indexing, and wherein the indexing settings include a parameter for one or more from a group of case sensitivity, tokenization, and hyphenation;

computer usable program code operable to store the metadata of the plurality of documents in a local metadata store in native form and cross referenced with the unique document identifiers;

computer usable program code operable to re-index the metadata of the plurality of documents from the metadata in native form in the local metadata store to generate a second metadata index for a specified one of the metadata fields separately and independently from the first metadata index for the specified field while performing searches using the first metadata index for the specified field and maintaining the first metadata index for the specified field separate from the second metadata index for the specified field, the second metadata index for the specified field being an inverted index that is parallel with the content index and refers to the same documents as the content index, wherein the re-indexing of the metadata is performed from the metadata in native form in the local metadata store without processing the plurality of documents and results in different indexing settings for the second metadata index for the specified field in relation to the first metadata index for the specified field; and computer usable program code operable to perform searches with the second metadata index by:
replacing the first metadata index for the specified field with the second metadata index and discarding the first metadata index for the specified field;
applying a query to the parallel content index and each metadata index to produce search results from each of the content and metadata indexes; and
merging the search results from the content index and each metadata index to produce combined search results for the query.

7. The computer program product of claim 6, wherein the computer usable program code operable to re-index the metadata is further operable to re-index the metadata in response to at least one searchable attribute of the metadata being redefined.

8. The computer program product of claim 6, wherein the computer usable program code operable to store the metadata is further operable to store the metadata in the same computer readable medium as the first metadata index.

9. The computer program product of claim 6, wherein the computer usable program code operable to store the metadata is further operable to store the metadata in a local computer readable medium.

10. The computer program product of claim 6, wherein the computer usable program code operable to index the metadata is further operable to index the metadata according to metadata attribute mappings.

11. A computer implemented system for performing searches by indexing a plurality of documents containing content and metadata, each of the plurality of documents having a unique document identifier, the system comprising:
a processor; and
a computer readable storage medium operably coupled to the processor and containing computer useable program code which when run by the processor causes the processor to be operable to:
index the content of the plurality of documents to generate an inverted content index;
index the metadata of the plurality of documents to generate a first metadata index for each of a plurality of different metadata fields for the plurality of documents, each first metadata index for a corresponding metadata field being an inverted index that is parallel with the content index and refers to the same documents as the content index, wherein indexing settings are specified for each of the plurality of different metadata fields to indicate treatment of data in the metadata fields for indexing, and wherein the indexing settings include a parameter for one or more from a group of case sensitivity, tokenization, and hyphenation;
store the metadata of the plurality of documents in a local metadata store in native form and cross referenced with the unique document identifiers;
re-index the metadata of the plurality of documents from the metadata in native form in the local metadata store to generate a second metadata index for a specified one of the metadata fields separately and independently from the first metadata index for the specified field while performing searches using the first metadata index for the specified field and maintaining the first metadata index for the specified field separate from the second metadata index for the specified field, the second metadata index for the specified field being an inverted index that is parallel with the content index and refers to the same documents as the content index, wherein the re-indexing of the metadata is performed from the metadata in native form in the local metadata store without processing the plurality of documents and results in different indexing settings for the second metadata index for the specified field in relation to the first metadata index for the specified field; and perform searches with the second metadata index by:
  replacing the first metadata index for the specified field with the second metadata index and discarding the first metadata index for the specified field;
  applying a query to the parallel content index and each metadata index to produce search results from each of the content and metadata indexes; and
  merging the search results from the content index and each metadata index to produce combined search results for the query.

12. The computer implemented system of claim 11, wherein the computer usable program code operable to cause the processor to re-index the metadata causes the processor to re-index the metadata in response to at least one searchable attribute of the metadata being redefined.

13. The computer implemented system of claim 11, wherein the computer usable program code operable to cause the processor to store the metadata is further operable to cause the processor to store the metadata in the same computer readable medium as each first metadata index.

14. The computer implemented system of claim 11, wherein the computer usable program code operable to cause the processor to store the metadata is further operable to cause the processor to store the metadata in a computer readable medium that is local to the system.

15. The computer implemented system of claim 11, wherein the computer usable program code operable to cause the processor to index the metadata is further operable to cause the processor to index the metadata according to metadata attribute mappings.

16. The method of claim 1, further comprising:
receiving document indexing settings at an indexing engine of an indexing system, the document indexing settings including indexing settings for the content and the indexing settings for individual ones of the metadata fields, wherein the indexing engine is used for indexing the content to generate the inverted context index in accordance with the indexing settings for the content, wherein the indexing engine is used for indexing the metadata to generate each first metadata index for the metadata fields in accordance with the indexing settings for the metadata fields; and
providing the inverted context index and each first metadata index to a search engine by the indexing engine to allow searching of the inverted context index and each first metadata index.

17. The method of claim 16, further comprising:
receiving new indexing settings for the specified field of the metadata at the indexing engine; and
re-indexing the metadata in native form from the local metadata store according to the new indexing settings for the specified field of the metadata to generate the second metadata index while maintaining the first metadata index for the specified field in an available state.

* * * * *